US009622495B2

(12) United States Patent
von Rege et al.

(10) Patent No.: US 9,622,495 B2
(45) Date of Patent: Apr. 18, 2017

(54) METHODS TO DECONTAMINATE CEREAL GRAINS WITH CHLORINE DIOXIDE

(71) Applicant: Diversey, Inc., Sturtevant, WI (US)

(72) Inventors: Henry von Rege, Alzey (DE); Petr Basar, Prague (CZ); Karel Kosar, Brno Prague (CZ)

(73) Assignee: DIVERSEY, INC., Sturtevant, WI (US)

( * ) Notice: Subject to any disclaimer, the term of this patent is extended or adjusted under 35 U.S.C. 154(b) by 0 days.

(21) Appl. No.: 14/346,516

(22) PCT Filed: Sep. 21, 2012

(86) PCT No.: PCT/US2012/056622
§ 371 (c)(1),
(2) Date: Mar. 21, 2014

(87) PCT Pub. No.: WO2013/044062
PCT Pub. Date: Mar. 28, 2013

(65) Prior Publication Data
US 2014/0227390 A1  Aug. 14, 2014

Related U.S. Application Data

(60) Provisional application No. 61/538,551, filed on Sep. 23, 2011.

(51) Int. Cl.
| A23L 1/186 | (2006.01) |
| A23B 9/30 | (2006.01) |
| C12C 1/02 | (2006.01) |
| C12C 1/027 | (2006.01) |
| A23B 9/18 | (2006.01) |
| A23L 7/20 | (2016.01) |
| A23L 7/25 | (2016.01) |

(52) U.S. Cl.
CPC .......... *A23B 9/30* (2013.01); *A23B 9/18* (2013.01); *A23L 7/20* (2016.08); *A23L 7/25* (2016.08); *C12C 1/02* (2013.01); *C12C 1/027* (2013.01)

(58) Field of Classification Search
CPC ................ A23L 1/186; A23B 9/30
USPC ............................................ 426/9, 532
See application file for complete search history.

(56) References Cited

U.S. PATENT DOCUMENTS

| 2,478,043 | A | * | 8/1949 | Evans | 426/253 |
| 6,033,704 | A | | 3/2000 | Talley | |
| 6,660,287 | B1 | | 12/2003 | Khanna et al. | |

| 2003/0021819 | A1 | 1/2003 | Khanna et al. |
| 2005/0034997 | A1 | 2/2005 | DiMascio et al. |
| 2006/0040040 | A1 | 2/2006 | Coste et al. |
| 2007/0036871 | A1 | 2/2007 | Westerman et al. |
| 2008/0292727 | A1 | 11/2008 | Westerman |
| 2011/0059185 | A1 | 3/2011 | Saefkow et al. |

FOREIGN PATENT DOCUMENTS

| CN | 101658207 | 3/2010 |
| WO | WO-2008/084407 A2 | 7/2008 |
| WO | WO-2011/038317 A1 | 3/2011 |

OTHER PUBLICATIONS

Bishop, L. R. et al. Second memorandum on barley germination. The Inst. Brewing Scheme. Sep.-Oct. 1945. pp. 215-224.*
Barakat, Hassan et al., "The antifungal protein AFP from Aspergillus giganteus prevents secondary growth of different *Fusarium* species on barley," Appl Microbiol Biotechnol, (2010), vol. 87, pp. 617-624.
International Preliminary Report on Patentability issued in Patent No. PCT/US2012/056622 mailed Apr. 3, 2014 (7 pages).
International Search Report and Written Opinion issued in Patent No. PCT/US2012/056622 mailed Dec. 3, 2012 (12 pages).
Pillai, K. Chandrasekara et al., "Studies on process parameters for chlorine dioxide production using Ir02 anode in an un-divided electrochemical cell," Jrnl of Hazardous Materials, (2009), vol. 164, pp. 812-819.
Sarlin, Tuija et al., "Fungal Hydrophobins as Predictors of the Gushing Activity of Malt," Jrnl of the Institute of Brewing, (2005), vol. 111, No. 2, pp. 105-111.
Wolf-Hall, Charlene E., "Mold and mycotoxin problems encountered during malting and brewing," Intl Jrnl of Food Microbiology, (2007), vol. 119, pp. 89-94.
First Office Action received in CN Patent Application 201280048400.9, mailed May 28, 2015, with English translation (22 pages).
Second Office Action received in CN Patent Application 201280048400.9, mailed Mar. 2, 2016, with English translation (9 pages).

* cited by examiner

*Primary Examiner* — Hamid R Badr
(74) *Attorney, Agent, or Firm* — Foley & Lardner LLP

(57) ABSTRACT

Methods are provided which include steeping and/or spraying a harvested cereal grain, such as barley, wheat, rye, millet, corn (maize), rice, or oats, in or with an aqueous solution including an effective amount of chlorine dioxide to provide a treated cereal grain. The treated cereal grain obtained from chlorine-dioxide steeping and/or spraying generally has a reduced microorganism and/or toxin content, and may be subjected to additional malting processes.

20 Claims, No Drawings

METHODS TO DECONTAMINATE CEREAL GRAINS WITH CHLORINE DIOXIDE

CROSS-REFERENCE TO RELATED PATENT APPLICATIONS

This application is a national stage application under 35 U.S.C. 371 of International Application No. PCT/US2012/056622, filed on Sep. 21, 2012, which claims priority from U.S. Provisional Patent Application No. 61/538,551, filed Sep. 23, 2011, each of which is incorporated hereby by reference in its entirety.

FIELD

The present technology relates generally to the field of treatment of cereal grains with chlorine dioxide.

BACKGROUND

The following description is provided to assist the understanding of the reader. None of the information provided or references cited is admitted to be prior art to the present technology.

Secondary growth of fungi in cereal grains is a common post-harvest issue arising when (pre-infected) crops become infested with fungi during storage or food processing. A notable example of the problems associated with secondary fungal growth is that of barley, commonly used in malting and brewing. A variety of species of *Fusarium* fungi may contaminate harvested barley if the barley was grown during a wet summer or if the barley was improperly stored (e.g., in a humid environment). Certain species of *Fusarium* are highly pathogenic to humans and may produce potent mycotoxins, some of which are carcinogenic.

Certain steps in the malting process for barley and other cereal grains can exacerbate fungal or other microorganism contamination. The malting process for cereal grains can be viewed as including four major steps: cleaning and sizing of the grains, steeping, germination, and kilning. Cleaning and sizing is performed to remove contaminated or damaged kernels and other undesirable materials. Steeping involves submersing the cleaned grain in cool-to-warm water, such that the moisture content of the cleaned grained is increased. The bottoms of steeping tanks may be fitted with equipment to facilitate agitation, aeration and washing of the cereal grain during steeping. The final moisture level of the steeped cereal grain will vary depending on the intended use of the malt, however, moisture levels in the range of 35-50% are common for steeped cereal grains such as steeped barley. A cereal grain may be subjected to more than one steeping, employing resting or aeration steps between steepings.

The steeped cereal grain is transferred to germination bins (or floors), and temperature- and humidity-controlled air is passed through the steeped cereal grain, which may be periodically mixed or turned. Alternatively, the steeped cereal grain may be sprayed with water to maintain the proper humidity. The temperature and humidity levels of the air vary depending on the desired qualities of the final malt, but temperatures of 12-25° C. and a humidity level approaching 100% are commonly employed. During the germination period (typically 2-7 days), the seedlings metabolic systems become fully activated, as evidenced by the emergence of rootlets, growth of the acrospires (coleoptile, spire, blade) and large increases in respiration and heat output. The germination period serves to develop enzymes required to modify the cereal grain's starches into sugars such as glucose, fructose, sucrose, and maltose.

After germination, the "green malt" is transferred to a kiln and dried using warm air (e.g., 40-60° C.) such as to reduce the moisture content of the malt (typically to approximately 20%), thereby arresting further germination. Malt used in brewing may be further subjected to further kilning (curing) at elevated temperatures (e.g., 60-105° C.), thereby reducing the moisture content to approximately 3-6%. Typically, kilning may last for 12-24 hours, although longer periods may be used.

In malting, the steeping and germination processes create ideal environmental conditions (i.e., warm and moist) under which various *Fusarium* species and other pathogens may flourish. Thus, such pathogens may be concentrated in the final malt or products derived therefrom, such as beer. Moreover, some toxins produced by pathogens are heat stable, and survive the kilning process. For example, certain potent mycotoxins produced by *Fusarium* such as deoxynivalenol, HT-2, and T-2 are largely unaffected by the kilning process and eventually make their way into beer produced from *Fusarium*-contaminated cereal grains. In addition to food safety concerns, microorganism contamination in malted cereal grains is also associated with a variety of quality issues in food and beverages derived from such cereal grains. For example, certain metabolites and enzymes produced by *Fusarium* in contaminated barley are associated with off-flavors in malt, wort, and beer. Such metabolites and enzymes produced by *Fusarium* and other microorganisms found on barley and other cereals, may also contribute to the undesired phenomenon known as beer-gushing. In beer gushing, beer spontaneously, without agitation, vigorously over-foams out from its packaging immediately on opening.

There is significant interest in developing effective decontamination methods for cereal grains used in malting processes. Ideally, such decontamination methods reduce or eliminate microorganisms and their associated toxins and metabolites. Further, such decontamination methods should help reduce beer gushing caused by some microorganisms. However, such methods should not impact the quality of the final malt or products produced therefrom.

SUMMARY

According to one aspect, the present technology provides a method including steeping a harvested cereal grain in an aqueous solution including an effective amount of chlorine dioxide, spraying the harvested cereal grain with water comprising an effective amount of chlorine dioxide during germination, or a combination thereof, to provide a treated cereal grain. In some embodiments, the method includes steeping a harvested cereal grain in an aqueous solution including an effective amount of chlorine dioxide and also spraying the harvested cereal grain with water comprising an effective amount of chlorine dioxide during germination, to provide a treated cereal grain. In other embodiments, the method includes steeping a harvested cereal grain in an aqueous solution including an effective amount of chlorine dioxide and spraying the harvested cereal grain with water that does not include chlorine dioxide during germination. In further embodiments, the method includes steeping a harvested cereal grain in an aqueous solution that does not include chlorine dioxide and spraying the harvested cereal grain with water including an effective amount of chlorine dioxide during germination. In some embodiments, the harvested cereal grain is barley, wheat, rye, millet, corn (maize), rice, oats or other cereals.

In some embodiments, the harvested cereal grain is washed with water without chlorine dioxide, and/or steeped in water without chlorine dioxide, before the chlorine dioxide steeping step. In some embodiments, the chlorine dioxide steeping step is repeated, i.e., the treated cereal grain is further steeped in an aqueous solution including an effective amount of chlorine dioxide to provide a further treated cereal grain. In such embodiments, the aqueous solution including an effective amount of chlorine dioxide which is used in the second or subsequent steeping step may be of the same or different concentration than the aqueous solution including an effective amount of chlorine dioxide in the first or previous steeping step. In some embodiments, the harvested cereal grain is washed with water without chlorine dioxide, and/or steeped in water without chlorine dioxide, before an aqueous solution of an effective amount of chlorine dioxide is sprayed onto the cereal grain during a germinating step.

In some embodiments, the aqueous solution including an effective amount of chlorine dioxide includes from about 1 ppm to about 50 ppm of chlorine dioxide. In some embodiments, the aqueous solution including an effective amount of chlorine dioxide includes from about 1 ppm to about 40 ppm of chlorine dioxide. In some embodiments, the aqueous solution including an effective amount of chlorine dioxide includes from about 1 ppm to about 30 ppm of chlorine dioxide. In some embodiments, the aqueous solution including an effective amount of chlorine dioxide includes from about 1 ppm to about 25 ppm of chlorine dioxide. In some embodiments, the aqueous solution an effective amount of including chlorine dioxide includes from about 1 ppm to about 20 ppm of chlorine dioxide. In some embodiments, the aqueous solution including an effective amount of chlorine dioxide includes from about 1 ppm to about 12 ppm of chlorine dioxide. In some embodiments, the aqueous solution including an effective amount of chlorine dioxide has a pH from about 4 to about 10. In some embodiments, the aqueous solution consists essentially of chlorine dioxide and water. In this regard, the aqueous solution does not include active ingredients other than chlorine dioxide, but may include precursors from which the chlorine dioxide was generated, byproducts produced in the generation of chlorine dioxide, stabilizers for chlorine dioxide, or other inactive ingredients (i.e., ingredients that lack antimicrobial activity).

In some embodiments, the steeping step is performed at a temperature of about 5° C. to about 30° C. In some embodiments, the steeping step is performed for a period of time from about 1 hour to about 10 hours. In some embodiments, the method further includes separating the treated cereal grain from the aqueous solution after the chlorine dioxide steeping step and optionally washing the treated cereal grain with water after the separating step. For example, the cereal grain may be filtered from the aqueous solution after the chlorine dioxide steeping step and optionally washed with water.

In some embodiments, the treated cereal grain has a chlorine dioxide concentration of less than about 1 part chlorine dioxide per 200 parts treated cereal grain (i.e., less than about 0.5 wt %). In some embodiments, the method further includes germinating the treated cereal grain after chlorine dioxide steeping step. During germination, an aqueous solution of chlorine dioxide may be sprayed on the cereal grain to adjust humidity. In some embodiments, the method further includes malting the treated cereal grain.

The methods provided by the present technology generally reduce microorganism concentrations in cereal grains. Thus, in another embodiment of the present methods, the harvested cereal grain has a first microorganism concentration; the treated cereal grain has a second microorganism concentration; the second microorganism concentration is reduced from a third microorganism concentration of an untreated cereal grain; and the untreated cereal grain is harvested cereal grain steeped in water without chlorine dioxide under substantially similar conditions to the chlorine dioxide steeping step. In some such embodiments, the second microorganism concentration is reduced from the third microorganism concentration by at least about 50% to 99.999%. In some embodiments, the second microorganism concentration is reduced from the first microorganism concentration.

In some embodiments, the microorganism is one or more of a fungus (i.e., a mold and/or a yeast), or bacteria. In some such embodiments, the microorganism is one or more of a *Fusarium*, *Alternarium*, *Muccor*, *Pencillium*, *Aspergillus* and the like. In some embodiments, the microorganism is a *Fusarium* and is one or more of *Fusarium graminearum*, *Fusarium acuminatum*, *Fusarium tricinctum*, *Fusarium equiseti*, *Fusarium sporotrichioides*, *Fusarium crookwellens*, *Fusarium avenaceum*, *Fusarium poae*, *Fusarium oxysporum*, *Fusarium culmorum*, *Fusarium chlamydosporum*, *Fusarium moniliforme*, *Fusarium proliferatum*, *Fusarium semitectum*, or *Fusarium verticilloides*.

In addition to reducing microorganism concentrations in cereal grains, the methods provided by the present technology generally reduce toxin concentrations in cereal grains. Thus, in another embodiment of the present methods, the harvested cereal grain has a first microorganism concentration toxin concentration; the treated cereal grain has a second toxin concentration; the second toxin concentration is reduced from a third toxin concentration of an untreated cereal grain; and the untreated cereal grain is harvested cereal grain steeped in water without chlorine dioxide under substantially similar conditions to the chlorine dioxide steeping step. In some such embodiments, the second toxin concentration is reduced from the third toxin concentration by at least about 5% to at least about 25%. In some embodiments, the second toxin concentration is reduced from the first toxin concentration.

In some embodiments, the toxin is a mycotoxin and is one or more of aflatoxin (AFLA), ochratoxin, citrinin, patulin, fumonisin (FUM), trichothecene, beauvericin, enniatin, butenolide, equisetin, culmonrin, or fusarin, deoxynivalenol (DON), 3-acetyldeoxynivalenol (3-ADON), 15-acetyldeoxynivalenol (15-ADON), zearalenone (ZON), nivalenol (NIV), 4-acetylnivalenol (4-ANIV), 4,15-diacetylnivalenol (4,15-DANIV), HT-2 toxin, T-2 toxin, fusarenon X (FUS-X), and diacetoxyscirpenol (DAS). In some exemplary embodiments, the mycotoxin is deoxynivalenol (DON) and/or zearalenone (ZON).

According to another aspect, the present technology provides a treated cereal grain, such as treated barley, wheat, rye, millet, corn, rice, or oats, prepared by any of the aforementioned methods. In some embodiments, the treated cereal grain has a residual chlorine dioxide concentration of less than about 1 part chlorine dioxide per 200 parts treated cereal grain. According to another aspect, the present technology provides a malt prepared from any of the aforementioned methods, such as a malt prepared from treated barley.

DETAILED DESCRIPTION

The illustrative embodiments described in the detailed description and claims are not meant to be limiting. Other embodiments may be utilized, and other changes may be made, without departing from the spirit or scope of the subject matter presented here.

The technology is described herein using several definitions, as set forth throughout the specification.

The use of the terms "a" and "an" and "the" and similar referents in the context of describing the elements (especially in the context of the following claims) are to be construed to cover both the singular and the plural, unless otherwise indicated herein or clearly contradicted by context.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The present technology provides methods for treating harvested cereal grains, treated cereal grains, and downstream products derived from treated cereal grains. As used herein, the term "cereal grain" and grammatical forms thereof will be understood by persons of ordinary skill in the art and refers to any member of the grass family (Poaceae, formerly known as Gramineae) which produces edible, starchy grains suitable for use in human, or other animal, consumption. Examples of cereal grains include, but are not limited to, barley, wheat, rye, millet, corn (maize), rice, oats, sorghum, and buckwheat. As used herein, the term "harvested cereal grain" refers to a cereal grain which has been removed or cut (manually or by machine) from its site of cultivation. Harvested cereal grain may have been washed (e.g., with water) to remove dust, insects, plant debris, or other undesirable materials. Harvested cereal grain may be used whole or may have been processed to remove the hull, husk, or germ portion of the seed. In the case of malting, harvested cereal grain is often dried and stored for a period of several weeks to several months prior to use. As used herein, the term "treated cereal grain" and grammatical forms thereof refers to any harvested cereal grain that has been subjected to either chlorine dioxide steeping, chlorine dioxide germinating, or a combination of chlorine dioxide steeping and chlorine dioxide germinating, as further described below.

According to one aspect, the present technology provides a method including steeping a harvested cereal grain one or more times in an aqueous solution including an effective amount of chlorine dioxide, spraying the harvested cereal grain with water comprising an effective amount of chlorine dioxide during germination, or a combination thereof, to provide a treated cereal grain. In some embodiments, the method comprises steeping a harvested cereal grain in an aqueous solution comprising chlorine dioxide and spraying the harvested cereal grain with water that lacks chlorine dioxide during germination. In other embodiments, the method comprises steeping a harvested cereal grain in an aqueous solution that lacks chlorine dioxide and spraying the harvested cereal grain with water comprising an effective amount of chlorine dioxide during germination. In still other embodiments, the method comprises steeping a harvested cereal grain in an aqueous solution comprising chlorine dioxide and spraying the harvested cereal grain with water comprising an effective amount of chlorine dioxide during germination.

As used herein, the term "steeping" refers to wetting of the harvested cereal grain by whole or partial submersion in an aqueous solution or water. Submersion is used because spraying aqueous solutions on the cereal grain does not increase the moisture content sufficiently for germination to occur. Typically, steeping is performed in a large container, such as a vessel or vat, which may be equipped with a mechanical stirring, agitation and/or aeration equipment. Steeping is commonly performed as step in malting processes for harvested cereal grains such a barley. In malting, steeping is performed to raise the moisture content of the harvested cereal grain, thereby hydrating the endosperm mass and activating the metabolic processes of the dormant harvested cereal grain. A wide variety of steeping protocols may be employed depending on the type of harvested cereal grain to be malted, the harvested cereal grain quality and kernel size, the steeping vessel configuration, the downstream application of the malted cereal grain, and maltster preferences. Steeping times and temperatures can and will vary, depending on the specific quality requirements and/or taste preferences of the malted cereal grain. Harvested cereal grain may be steeped more than once, and two or three steepings are common, often over a total period of 2-4 days. Where multiple steepings are performed, the cereal grain may be rested or aerated between steepings.

As used herein, the term "chlorine dioxide" refers to $ClO_2$. The term "chlorine dioxide steeping" refers to steeping with an aqueous solution including an effective amount of chlorine dioxide. Due to its instability in pure or other concentrated form, chlorine dioxide is typically handled and used in dilute aqueous solutions. Aqueous solutions of chlorine dioxide may be prepared by numerous methods known in the art including, but not limited to those described by Vogt, H., Balej, J., Bennett, J. E., Wintzer, P., Sheikh, S. A., Gallone, P., Vasudevan, S. and Pelin, K. 2010 in Chlorine Oxides and Chlorine Oxygen Acids, Ullmann's Encyclopedia of Industrial Chemistry. Methods to produce aqueous solutions of chlorine dioxide include, but are not limited to, dissolution of chlorine dioxide gas (prepared from commercially available gaseous chlorine dioxide generators) in water or in situ preparation of aqueous solutions of chlorine dioxide from any number of chlorine dioxide precursors known in the art. For example, aqueous solutions of chlorine dioxide may be prepared by: chemical oxidation of sodium chlorite ($NaClO_2$) with $Cl_2$; chemical reduction of sodium chlorate ($NaClO_3$) with a reducing agent such as methanol, hydrochloric acid, or sulfur dioxide (where the reducing agent is not acidic, an exogenous acid may also be added such as sulfuric acid); treatment of sodium chlorite with acids such as hydrochloric acid or citric acid (optionally in the presence of sodium hypochlorite, NaOCl); and electrolysis of an aqueous solution of sodium hypochlorite. Aqueous solutions of chlorine dioxide may optionally include stabilizers and/or buffers. In some embodiments, the aqueous solution consists essentially of chlorine dioxide and water. In this regard, the aqueous solution does not include active ingredients other than chlorine dioxide, but may include: precursors from which the chlorine dioxide was generated (e.g., one or more of sodium chlorate, sodium chlorite, sodium hypochlorite, chlorine, acids such as citric acid or hydrochloric acid, methanol, sulfur dioxide, etc.); byproducts produced during the generation or decomposition of chlorine dioxide (e.g., one or more of sodium chloride, sodium hydroxide, hydrogen gas, hypochlorous acid, chlorous acid, hydrochloric acid); and/or buffers or stabilizers. In some embodiments, the aqueous solution of chlorine dioxide consists only of chlorine dioxide and water.

As used herein, the term "effective amount" refers to the amount of chlorine dioxide necessary to provide a measurable anti-microbial effect, such as a reduction in the number of *Fusarium* colony forming units (CFU) on barley as determined by the procedures of Example 1 herein. Examples of effective amounts of chlorine dioxide include 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50 ppm (e.g., µg/g) and ranges between and including any two of the foregoing values.

The concentration of the chlorine dioxide in the aqueous solution can and will vary. In this regard, the aqueous solution including chlorine dioxide may include about 0.1 ppm (e.g., µg/g) chlorine dioxide, about 0.5 ppm chlorine dioxide, about 1.0 ppm chlorine dioxide, about 2.0 ppm chlorine dioxide, about 3.0 ppm chlorine dioxide, about 4.0 ppm chlorine dioxide, about 5.0 ppm chlorine dioxide, about 6.0 chlorine dioxide, about 7.0 ppm chlorine dioxide, about 8.0 ppm chlorine dioxide, about 9.0 ppm chlorine dioxide, about 10.0 ppm chlorine dioxide, about 11.0 ppm chlorine dioxide, about 12.0 ppm chlorine dioxide, about 13.0 ppm chlorine dioxide, about 14.0 ppm chlorine dioxide, about 15.0 ppm chlorine dioxide, about 16.0 ppm chlorine dioxide, about 18.0 ppm chlorine dioxide, about 20.0 chlorine dioxide, about 22.0 ppm chlorine dioxide, about 24.0 ppm chlorine dioxide, about 25.0 ppm chlorine dioxide, about 26.0 ppm chlorine dioxide, about 28.0 ppm chlorine dioxide, about 30.0 ppm chlorine dioxide, about 35.0 ppm chlorine dioxide, about 40.0 ppm chlorine dioxide, about 45.0 ppm chlorine dioxide, about 50.0 ppm chlorine dioxide, or a range between and including any two of these values. In a certain embodiment, the aqueous solution includes from about 1 ppm to about 12 ppm of chlorine dioxide. In other embodiments, the aqueous solution includes from about 1 ppm to about 20 ppm of chlorine dioxide. In some embodiments, the aqueous solution includes from about 1 ppm to about 25 ppm of chlorine dioxide. In some embodiments, the aqueous solution includes from about 10 ppm to about 25 ppm of chlorine dioxide. In some embodiments, the aqueous solution includes from about 15 ppm to about 25 ppm of chlorine dioxide. In some embodiments, the aqueous solution includes from about 20 ppm to about 25 ppm of chlorine dioxide.

During the steeping steps, the quantity of aqueous chlorine dioxide, to which the grain is subjected, may depend on the concentration of chlorine dioxide in the aqueous steeping solution and the volume of the solution used. The concentration of the chlorine dioxide in the aqueous solution can be any value between about 0.1 ppm (e.g., µg/g) and about 50.0 ppm chlorine dioxide, or about 0.1 ppm and about 25.0 ppm chlorine dioxide, as described above, and the volume of the aqueous chlorine dioxide solution that is used during the steeping steps may, in turn, be expressed as a ratio in proportion to the dry weight of cereal grain that is being steeped. In this regard, the volume of the solution used during steeping may be a ratio of about 0.5 liters of aqueous chlorine dioxide solution per kilogram of dry grain to about 10 liters aqueous chlorine dioxide solution per kilogram of dry grain. In some embodiments, the volume of the solution used during steeping may be about 0.5 liters of aqueous chlorine dioxide solution per kilogram of dry grain, about 1 liter of aqueous chlorine dioxide solution per kilogram of dry grain, about 1.5 liters of aqueous chlorine dioxide solution per kilogram of dry grain, about 2 liters of aqueous chlorine dioxide solution per kilogram of dry grain, about 3 liters of aqueous chlorine dioxide solution per kilogram of dry grain, about 4 liters of aqueous chlorine dioxide solution per kilogram of dry grain, about 5 liters of aqueous chlorine dioxide solution per kilogram of dry grain, about 5.5 liters of aqueous chlorine dioxide solution per kilogram of dry grain, about 6 liters of aqueous chlorine dioxide solution per kilogram of dry grain, about 7 liters of aqueous chlorine dioxide solution per kilogram of dry grain, about 8 liters of aqueous chlorine dioxide solution per kilogram of dry grain, about 9 liters of aqueous chlorine dioxide solution per kilogram of dry grain, about 10 liters of aqueous chlorine dioxide solution per kilogram of dry grain, or a range between and including any two of these values.

The pH of the aqueous solution including an effective amount of chlorine dioxide can and will vary, depending on numerous factors, including but not limited to, the manner of its generation, as set forth above. For example, treatment of sodium chlorite with citric acid in an aqueous environment will provide an acidic aqueous solution which includes chlorine dioxide. The pH of the aqueous solution including an effective amount of chlorine dioxide may adjusted by addition of acids (e.g., hydrochloric acid, sulfuric acid, citric acid, etc.) or bases (e.g., carbonates, bicarbonates, hydroxides, amines, etc.). The pH of the aqueous solution including an effective amount of chlorine dioxide may be buffered. The pH of the aqueous solution including an effective amount of chlorine dioxide will be about 4, about 5, about 6, about 7, about 8, about 9, about 10, or a range between and including any two of these values. In certain embodiments, the aqueous solution including an effective amount of chlorine dioxide has a pH from about 4 to about 10.

The period of time for which the chlorine dioxide steeping step is performed can and will vary. For example, the chlorine dioxide steeping step can be performed for a time period of about 1 hour, about 2 hours, about 3 hours, about 4 hours, about 5 hours, about 6 hours, about 7 hours, about 8 hours, about 9 hours, about 10 hours, about 12 hours, about 14 hours, about 16 hours, about 18 hours, about 20 hours, about 22 hours, about 24 hours, or a range between and including any two of these values. During the chlorine dioxide steeping step, the harvested cereal grain may be submerged in the aqueous solution including an effective amount of chlorine dioxide during the entire period of time of the chlorine dioxide steeping step, or for a fraction of the period of time of the chlorine dioxide steeping step, depending on a variety factors such as the buoyancy of the cereal grain in the aqueous solution and/or the amount of agitation (stirring) used during the chlorine dioxide steeping step. For example, the harvested cereal grain may be submerged for about 50%, about 60%, about 70%, about 80%, or about 90% of any of the aforementioned periods of time for the steeping step. In some embodiments, the chlorine dioxide steeping step is performed for a time period of about 1 to about 10 hours. In some such embodiments, the harvested cereal grain is submerged for a time period of about 4 to about 6 hours.

The chlorine dioxide steeping step is can be performed at a temperature of about 5° C., about 10° C., about 11° C., about 12° C., about 13° C., about 14° C., about 15° C., about 16° C., about 17° C., about 18° C., about 19° C., about 20° C., about 25° C., about 30° C., or at a temperature range between and including any two of these values. In some embodiments, the chlorine dioxide steeping step is performed at a temperature range of about 10° C. to about 25° C., about 10° C. to about 20° C., about 13° C. to about 16° C., or is performed at a temperature of about 14.5° C.

The chlorine dioxide steeping step may be repeated, for example, 1, 2, or 3 or more times. Any of the conditions of a subsequent chlorine dioxide steeping step (e.g., period of time, temperature, chlorine dioxide concentration, agitation, etc.) may be the same or different from any of the corresponding conditions of the previous chlorine dioxide steeping step(s). For example, the methods of the present technology may include a first steeping of a harvested cereal grain in an aqueous solution including an effective amount of a first chlorine dioxide concentration (e.g., about 1 to 10 ppm or about 1 to about 25 ppm) at a first temperature (e.g., about 10° C.) for a first period of time (e.g., about 4 hours) to provide a treated cereal grain. The treated cereal grain may be subjected to a second steeping at a second chlorine dioxide concentration (e.g., about 1 to about 10 ppm or about 1 to about 25 ppm) at a second temperature (e.g., about 20° C.) for a second period of time (e.g., about 2 hours) to provide a further treated cereal grain. Where multiple chlorine dioxide steepings are performed, the treated cereal grain may be rested or aerated between the chlorine dioxide steepings.

Any of the present methods may include steeping harvested cereal grain or the treated cereal grain with water (i.e., water without chlorine dioxide). Thus, the harvested cereal grain may be steeped with water before the chlorine dioxide steeping step, or the treated cereal grain may be further steeped with water.

In contrast to contemporary malting methods, which typically employ water in steeping of harvested cereal grains, the present methods provide treated cereal grains with reduced microorganism concentrations and thus reduced concentrations of those metabolites, enzymes, and/or toxins associated with such microorganisms. As described above, harvested cereal grains are typically contaminated with various microorganisms including bacteria and/or fungi (e.g., molds and/or yeasts). In the malting of harvested cereal grains, certain steps of the malting process encourage secondary growth of such microorganisms. For example, steeping harvested cereal grains with water creates excellent environmental conditions for fungal growth and/or bacterial growth. Stated another way, water steeping serves to incubate fungi and bacteria. Likewise, the germination process may involve temperatures and humidity levels conducive for microbial growth. As such, germination also serves to incubate fungi and bacteria. In fact, because conditions for microbial growth are favorable during germination, the risk for microbial contamination is high during this stage. Thus, malted cereal grains prepared from contemporary processes employing water-steeping may possess high levels of microorganism contamination.

Certain species of microorganisms, such as those of *Fusarium, Alternarium, Muccor, Pencillium, Aspergillus* and many other strains of molds, yeast and bacteria are well-established to be pathogenic to humans and other animals. For example, *Fusarium* species may cause a range of opportunistic infections in humans, such as in the nails (onychomycosis) and in the cornea (keratomycosis or mycotic keratitis). In humans with compromised immune systems, fusarial infections may affect the entire body and bloodstream. In particular, certain *Fusarium* species, such as *Fusarium graminearum, Fusarium acuminatum, Fusarium tricinctum, Fusarium equiseti, Fusarium sporotrichioides, Fusarium crookwellens, Fusarium avenaceum, Fusarium poae, Fusarium oxysporum, Fusarium culmorum, Fusarium chlamydosporum, Fusarium moniliforme, Fusarium proliferatum, Fusarium semitectum,* and *Fusarium verticilloides* are problematic in the malting of barley.

Furthermore, many microorganisms produce toxins which display adverse effects on human and other animal health. Examples of such mycotoxins include, but are not limited to, aflatoxin (AFLA), ochratoxin, citrinin, patulin, fumonisin (FUM), trichothecene, beauvericin, enniatin, butenolide, equisetin, culmonrin, or fusarin, deoxynivalenol (DON), 3-acetyldeoxynivalenol (3-ADON), 15-acetyldeoxynivalenol (15-ADON), zearalenone (ZON), nivalenol (NIV), 4-acetylnivalenol (4-ANIV), 4,15-diacetylnivalenol (4,15-DANIV), HT-2 toxin, T-2 toxin, fusarenon X (FUS-X), and diacetoxyscirpenol (DAS). Notably, certain mycotoxins such as HT-2 and T-2 are heat-stable, and as such, they survive kilning processes used in the manufacture malted cereal grains. Such toxins may accumulate during the malting process and remain in the final malted cereal grain. Therefore, food and beverages which employ such malted cereal grains in their preparation may also be contaminated with toxins. This is particularly problematic in the case of the brewing industry, where toxins accumulate in the final brewed beverage (e.g., beer produced from malted barley contaminated with *Fusarium*).

In addition to the aforementioned food safety concerns, the presence of microorganisms or their associated toxins, metabolites, or enzymes in cereal grains can adversely affect food quality. For example, various secondary metabolites and enzymes produced by *Fusarium* (and/or other microorganisms) in contaminated barley can affect the quality of malt, wort, and beer. In this regard, they may inhibit the function of process-important barley enzymes, cause off flavors, and contribute to beer gushing. Two types of gushing are believed to exist in beer: (i) primary gushing which is induced by fungal metabolites (gushing factors) which are present in malted barley (or other cereal grain) and (ii) secondary gushing caused by a variety of factors including impurities form bottles, metal ions, calcium oxalate crystals, residual bottle cleaning agents). Gushing factors produced by *Fusarium*, as well as certain species of *Aspergillus, Nigrospora, Penicillium,* and *Stemphylium*, are typically polypeptides or peptide-containing substances. Minute amounts of gushing factors, in the ppm range or lower, can induce beer-gushing. Gushing factors are assumed to be surface active molecules which stabilize carbon dioxide bubbles in beer by forming a layer around the microbubbles. The layer prevents breakdown of the bubbles, leading to over-foaming. The present methods, which employ chlorine dioxide steeping, allow for the production treated cereal grains with low concentrations of microorganisms and their associated toxins, metabolites, and enzymes, and thus also allow for the production of high quality, minimally contaminated malted cereal grains.

In the present methods which employ at least one chlorine dioxide steeping step, at least one chlorine dioxide spraying step during germination, or a combination thereof, the concentration of microorganisms in treated cereal grain are reduced in comparison to an untreated cereal grain which has undergone steeping and germinating with water under otherwise substantially similar conditions. Stated another way, microorganism concentrations of the treated cereal grain are reduced in comparison to a control which has undergone steeping and germinating with water (without chlorine dioxide) under otherwise substantially similar conditions. By "substantially similar conditions" it is meant that harvested cereal grain, which is identically sourced (e.g., from the same crop), stored, and processed (e.g., washed vs. unwashed), is steeped and germinated with water without chlorine dioxide at a similar temperature, pressure, aerobic environment, duration, scale, agitation, and in vessels configuration as used in chlorine dioxide steeping and germinating steps. As used herein, the term "microorganism concentration" refers to the concentration of a single species of microorganism or the total concentration of multiple species of microorganisms, which may or may not be from different genera. For clarity, where microorganism concentrations (or toxin concentrations, below) are compared, for example between a harvested cereal grain and a treated cereal grain, it is understood that identities of the one or more microorganisms of which the concentrations are being compared are the same. In some embodiments, the harvested cereal grain has a first microorganism concentration; the treated cereal grain has a second microorganism concentration; the second microorganism concentration is reduced from a third microorganism concentration of an untreated cereal grain; and the untreated cereal grain is harvested cereal grain steeped and/or germinated in water without chlorine dioxide under substantially similar conditions to the chlorine dioxide steeping and/or germinating steps. In comparison to a microorganism concentration of an untreated cereal grain, the microorganism concentration of a treated cereal grain may be reduced by at least about 50%, about 60%, about 70%, about 80%, about 90%, about 99%, about 99.9%, about 99.99%, about 99.999%, or a range between and including any two of these values. Reduction of microorganism concentration (e.g., percent kill, PK) is often expressed in terms of log reduction, LR, where PK= $(1-10^{-LR}) \times 100\%$. More specifically, LR is the $\log_{10}$ of the ratio, (untreated carrier cell density)/(treated carrier cell density). Thus, the microorganism concentration may be reduced by an LR of at least about 0.30, about 0.40, about 0.53, about 0.70, about 1, about 2, about 3, about 4, about 5, or a range between and including any two of these values.

Furthermore, chlorine dioxide steeping and/or chlorine dioxide spraying during germination also provides a treated cereal grain with a microorganism concentration which is less than that of the harvested cereal grain (i.e., prior to chlorine dioxide steeping). Thus, in some embodiments, the second microorganism concentration (i.e., of treated cereal grain) is reduced from the first microorganism concentration (i.e., of harvested cereal grain). In comparison to a microorganism concentration of harvested cereal grain, the microorganism concentration of a treated cereal grain may be reduced by at least about 50%, about 60%, about 70%, about 80%, about 90%, about 99%, about 99.9%, about 99.99%, about 99.999%, or a range between and including any two of these values.

The microorganism may be any microorganism associated with a cereal grain. In some embodiments, at least one microorganism a fungus (i.e., a mold and/or a yeast), or bacteria. In some such embodiments, at least one microorganism or one or more microorganisms is *Fusarium, Alternarium, Muccor, Pencillium,* or *Aspergillus*. In some embodiments, the microorganism is a *Fusarium* species and is at least one (or more) of *Fusarium graminearum, Fusarium acuminatum, Fusarium tricinctum, Fusarium equiseti, Fusarium sporotrichioides, Fusarium crookwellens, Fusarium avenaceum, Fusarium poae, Fusarium oxysporum, Fusarium culmorum, Fusarium chlamydosporum, Fusarium moniliforme, Fusarium proliferatum, Fusarium semitectum,* or *Fusarium verticilloides*.

Microorganism concentrations on harvested cereal grains, treated cereal grains, and untreated cereal grains may be measured by a variety of techniques well known in the art. For example, microorganisms may be extracted or otherwise removed from the cereal grains by washing and/or vortexing the cereal grains with water (or other suitable diluent), preparing a dilution series, plating, and incubating the plated solutions. The microorganism grown on the plates may then be counted. Typically, microorganism concentrations may be expressed in terms of colony forming units (CFU) per gram. As an alternative to plating from a dilution series, the microorganism concentration of cereal grains may be obtained employing a most probable number (MPN) method using established procedures.

Similarly, the toxin concentration associated with the treated cereal grain may be less both in comparison to a control (i.e., an untreated cereal grain which has undergone steeping with water without chlorine dioxide under otherwise substantially similar conditions) as well as in comparison to the harvested cereal grain (i.e., prior to chlorine dioxide steeping). Thus, in some embodiments, the harvested cereal grain has a first microorganism concentration toxin concentration; the treated cereal grain has a second toxin concentration; the second toxin concentration is reduced from a third toxin concentration of an untreated cereal grain; and the untreated cereal grain is harvested cereal grain steeped in water without chlorine dioxide under substantially similar conditions to the chlorine dioxide steeping step. In such embodiments, the second toxin concentration is reduced from the third toxin concentration by at least about 5%, about 10%, about, 15%, about 20%, about 25%, about 30%, about 40%, about 50% or a range between and including any two of these values. In some embodiments, the second toxin concentration is reduced from the third toxin concentration by at least about 5% to at least about 25%. In some embodiments, the second toxin concentration is reduced from the first toxin concentration, for example by at least about 5%, about 10%, about 15%, about 20%, about 25%, about 30%, about 40%, about 50% or a range between and including any two of these values. In this regard, not only does chlorine dioxide steeping serve to arrest microorganism growth (and thus the ability of such microorganisms to produce additional toxins), the chlorine dioxide steeping may remove toxins initially present (i.e., previously produced) in the harvested cereal grain. Without wishing to be bound by any particular theory, it is believed that the chlorine dioxide may oxidize many such toxins to innocuous materials during the chlorine dioxide steeping step. Such innocuous materials may be partially or fully extracted into aqueous solution during the chlorine dioxide steeping step.

The toxin may be a mycotoxin, such as at least one (or more) of aflatoxin (AFLA), ochratoxin, citrinin, patulin, fumonisin (FUM), trichothecene, beauvericin, enniatin, butenolide, equisetin, culmonrin, or fusarin, deoxynivalenol (DON), 3-acetyldeoxynivalenol (3-ADON), 15-acetyldeoxynivalenol (15-ADON), zearalenone (ZON), nivalenol (NIV), 4-acetylnivalenol (4-ANIV), 4,15-diacetylnivalenol (4,15-DANIV), HT-2 toxin, T-2 toxin, fusarenon X (FUS-X), and diacetoxyscirpenol (DAS). In some exemplary embodiments, the mycotoxin is deoxynivalenol (DON) and/or zearalenone (ZON).

After the chlorine dioxide steeping step, typically the treated cereal grain will be separated from the aqueous solution including an effective amount of chlorine dioxide and optionally washed with water. The treated cereal grain may be separated from the aqueous solution using techniques known in the art such as decantation or filtration. Washing the treated cereal grain with water serves to remove residual chlorine dioxide which may remain after separation. In this regard, the treated cereal grain may have a chlorine dioxide concentration of less than about 1, about 0.5, about 0.1, about 0.05, about 0.01, about 0.005, about 0.001, about 0.0005, or about 0.00001 parts chlorine dioxide per 200 parts treated cereal grain. In certain embodiments, the treated cereal grain has a chlorine dioxide concentration of less than about 1 part chlorine dioxide per 200 parts treated cereal grain. Residual chlorine dioxide in treated cereal grains may be determined by adapting known procedures for measuring chlorine dioxide in food products. For example, residual chlorine dioxide may be extracted from a sample of the treated cereal grain by washing and/or vortexing the cereal grain with water (or other suitable diluent), followed by filtration (to remove the washed cereal grain). The chlorine dioxide concentration of the aqueous extract may be determined using a comparative or spectrophotometric test kit based on diethyl-p-phenylenediamine (DPD) reagent available from HACH or Dr. Lange (Germany).

The treated cereal grain prepared according to the present technology is of sufficient quality that it may be used in any contemporary food and beverage applications for which steeped cereal grains are used. For example, the treated cereal grain may be used in the preparation of malted cereal grain which itself may be further employed in the production of beer, whisky, malt vinegar, malt extracts, etc. In this regard, the treated cereal grains may be further subjected any of the steps/processes commonly employed in the malting of cereal grains. Of course, the nature of further processing of the treated cereal grain will depend on the ultimate end-use of the material. For example, the treated cereal grain may be further steeped (in water with or without chlorine dioxide), washed, aerated, germinated, kilned, dried, optionally ground, mashed, packaged, stored, added to or otherwise used to prepare food or beverage products (e.g., via fermentation), etc.

In some embodiments, the treated cereal grain (e.g., barley) may be germinated prior to malting. During germination, the cereal grain may be sprayed with a solution of chlorine dioxide one or more times in order to maintain the proper level of humidity for germination.

Such treatment of the cereal grain by spraying the grain, one or more times during germination, with an aqueous solution of chlorine dioxide has been found to further reduce or prevent *Fusarium* spore germination. In some embodiments, the cereal grain is steeped in water without any chlorine dioxide and subsequently sprayed with an aqueous solution of chlorine dioxide during germination. In other embodiments, the cereal grain is steeped in an aqueous solution of chlorine dioxide and also sprayed with an aqueous solution of chlorine dioxide during germination. In still further embodiments, the cereal grain is steeped in an aqueous solution of chlorine dioxide and sprayed with water lacking any chlorine dioxide during germination. Any concentration of chlorine dioxide, as described above for the aqueous steeping solutions, may be used for such spraying and even the steeping solution(s) themselves may be used if they retain a sufficient amount of chlorine dioxide.

In some embodiments, during germination, the concentration of the chlorine dioxide in the aqueous spray solution can and will vary. In this regard, the aqueous spray solution including an effective amount of chlorine dioxide may include 0 ppm (e.g., µg/g) chlorine dioxide, about 0.1 ppm chlorine dioxide, about 0.5 ppm chlorine dioxide, about 1.0 ppm chlorine dioxide, about 2.0 ppm chlorine dioxide, about 3.0 ppm chlorine dioxide, about 4.0 ppm chlorine dioxide, about 5.0 ppm chlorine dioxide, about 6.0 chlorine dioxide, about 7.0 ppm chlorine dioxide, about 8.0 ppm chlorine dioxide, about 9.0 ppm chlorine dioxide, about 10.0 ppm chlorine dioxide, about 11.0 ppm chlorine dioxide, about 12.0 ppm chlorine dioxide, about 13.0 ppm chlorine dioxide, about 14.0 ppm chlorine dioxide, about 15.0 ppm chlorine dioxide, about 16.0 ppm chlorine dioxide, about 18.0 ppm chlorine dioxide, about 20.0 chlorine dioxide, about 22.0 ppm chlorine dioxide, about 24.0 ppm chlorine dioxide, about 25.0 ppm chlorine dioxide, about 26.0 ppm chlorine dioxide, about 28.0 ppm chlorine dioxide, about 30.0 ppm chlorine dioxide, about 35.0 ppm chlorine dioxide, about 40.0 ppm chlorine dioxide, about 45.0 ppm chlorine dioxide, about 50.0 ppm chlorine dioxide, or a range between and including any two of these values. In certain embodiments, the aqueous spray solution including an effective amount of chlorine dioxide may include from about 1 ppm to about 12 ppm of chlorine dioxide. In other embodiments, the aqueous spray solution including an effective amount of chlorine dioxide may include from about 1 ppm to about 20 ppm of chlorine dioxide. In some embodiments, the aqueous spray solution including an effective amount of chlorine dioxide may include from about 1 ppm to about 25 ppm of chlorine dioxide. In some embodiments, the aqueous spray solution including an effective amount of chlorine dioxide may include from about 10 ppm to about 25 ppm of chlorine dioxide. In some embodiments, the aqueous spray solution including an effective amount of chlorine dioxide may include from about 15 ppm to about 25 ppm of chlorine dioxide. In some embodiments, the aqueous spray solution including an effective amount of chlorine dioxide may include from about 20 ppm to about 25 ppm of chlorine dioxide.

In some embodiments, the volume of aqueous chlorine dioxide solution that is sprayed onto the grains during germination can and will vary. Generally, about 0.01 $m^3$ to about 2.0 $m^3$ of aqueous chlorine dioxide solution will be sprayed onto each metric ton of dry grain (as weighed before the absorption of water during steeping). In this regard, the volume of aqueous chlorine dioxide solution that is sprayed onto each metric ton of dry grain during the germination step may include about 0.01 $m^3$ aqueous chlorine dioxide solution per metric ton of dry grain, about 0.10 $m^3$ aqueous chlorine dioxide solution per metric ton of dry grain, about 0.15 $m^3$ aqueous chlorine dioxide solution per metric ton of dry grain, about 0.20 $m^3$ aqueous chlorine dioxide solution per metric ton of dry grain, about 0.30 $m^3$ aqueous chlorine dioxide solution per metric ton of dry grain, about 0.40 $m^3$ aqueous chlorine dioxide solution per metric ton of dry grain, or about 0.50 $m^3$ aqueous chlorine dioxide solution per metric ton of dry grain, or about 1.0 $m^3$ aqueous chlorine dioxide solution per metric ton of dry grain, or about 2.0 $m^3$ aqueous chlorine dioxide solution per metric ton of dry grain, or a range between and including any two of these values, where the concentration of aqueous chlorine dioxide will generally be about 1 ppm (e.g., µg/g) to about 25 ppm, or where the concentration of aqueous chlorine dioxide will generally be about 20 ppm to about 25 ppm.

In some embodiments, the germinating step is performed at a temperature of about 5° C. to about 30° C. In some embodiments, the germinating step is performed for a period of about 3 days, 4 days, 5 days, 6 days, 7 days, or a range between and including any two of these values. In some embodiments, germinating step further includes one or more transfers of the germinating cereal grain from one germination box to another germination box, spraying one or more times with the aqueous chlorine dioxide solution, separating the germinated cereal grain from the aqueous solution, and optionally washing the germinated cereal grain with water after the separating step. For example, the cereal grain may be filtered from the aqueous solution after the chlorine dioxide spraying step(s) and optionally washed with water.

According to another aspect, the present technology provides a treated cereal grain, such as treated barley, wheat, rye, millet, corn, rice, or oats, prepared by any of the aforementioned methods. In some embodiments, the treated cereal grain has a residual chlorine dioxide concentration of less than about 5 ppm, about 4 ppm, about 3 ppm, about 2 ppm, about 1 ppm, about 0.5 ppm, or about 0.1 ppm. In certain embodiments, the treated cereal grain has a chlorine dioxide concentration of less than about 1 part chlorine dioxide per 200 parts treated cereal grain.

According to another aspect, the present technology provides a malt prepared from any of the aforementioned methods, such as a malt prepared from treated barley. In still another aspect, the present technology provides a method of preventing beer gushing comprising brewing beer with the malt prepared from barley treated using any of the methods described herein.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present technology, thus generally described, will be understood more readily by reference to the following Examples, which is provided by way of illustration and is not intended to be limiting of the present technology.

EXAMPLES

Example 1

Treatment of Barley (Artificially-Contaminated with *Fusarium*) with Chlorine Dioxide The performance of chlorine dioxide was investigated to reduce initial *Fusarium* load on barley. Prior to treatment with chlorine dioxide, barley samples were artificially contaminated with cells of *Fusarium* by spraying and drying.

Methods. Chlorine dioxide solutions were generated using Diversey's ClearKlens Bi-Spore Set (Base VH26 and Activator VH 26). Fresh stock solutions were prepared following product use instructions. Concentrations of chlorine dioxide in stock and use solutions were determined with a Dr. Lange test-kit (LCK 310/343) and photometric DR 2800 device. Chlorine dioxide use solutions were prepared diluting the Bi-Spore stock solution with aid of CEN hard water diluent (300 mg/kg $CaCO_3$). The neutralizing solution was based on sodium thiosulfate (5 g/L in ¼ strength Ringer solution). Experiments were carried out at ambient temperature and no soil on the basis of EN 1276. Chlorine dioxide use solutions for testing were determined to be 1 ppm and 10 ppm.

Test runs were conducted as follows. In a test tube, chlorine dioxide solution (10 ml) was added to barley (1 g) and the start time of the experiment was recorded. Barley and chlorine dioxide were mixed by vortexing for 10 seconds and then allowed to react for one hour. After treating the barley with chlorine dioxide solution for one hour, the solution was decanted. Shortly thereafter, a subsequent treatment for either 60 or 300 min with a fresh solution containing either 1 ppm $ClO_2$ or 10 ppm $ClO_2$ was performed. After completion of the second treatment, a portion of the mixture (1 mL) was pipetted into 9 ml of neutralizer and mixed. After 5 minutes reaction time, 1 mL of the neutralized solution was added to 9 mL Ringer diluent. A dilution series was prepared up to 1:10,000. From each dilution step, 1 mL (in duplicate) was plated on potato dextrose agar. Plates were incubated at 30° C. for 62 hours. Grown colonies on plates were counted and expressed at CFU per gram barley. A control experiment using Ringer solution instead of chlorine dioxide was performed following the same procedure. Results are presented in Tables 1 and 2.

Conclusions. The treatment with chlorine dioxide compared to a control without chlorine dioxide demonstrated a clear reduction of *Fusarium* counts on barley. The first treatment with 10 ppm chlorine dioxide followed by 1 ppm chlorine dioxide in a second step resulted in less reduction in *Fusarium* counts than a subsequent second step with 10 ppm chlorine dioxide. A treatment with 10 ppm chlorine dioxide at contact times of about 2-6 hours gave the highest reduction of *Fusarium* on barley. The efficiency of killing performance depends on the strength of chlorine dioxide and contact time.

TABLE 1

Treatment of barley with Ringer solution (control) compared to chlorine dioxide solutions at varying chlorine dioxide concentration. First treatment for 60 minutes followed by a second treatment with fresh solutions at two different contact times.

| Batch ($ClO_2$ as ppm) | Contact Time (min) | CFU/g after treatment | R (log batch control − log batch $ClO_2$) |
|---|---|---|---|
| Control (no $ClO_2$) | 60 min | $3.8 \times 10^7$ | — |
| 10 ppm + 1 ppm | 60 min + 60 min | $3.3 \times 10^6$ | 1.06 |
| 10 ppm + 1 ppm | 60 min + 300 min | $1.3 \times 10^7$ | 0.47 |

R = reduction in viability

TABLE 2

Treatment of barley with Ringer solution (control) compared to chlorine dioxide solution at varying chlorine dioxide concentration. First treatment for 60 minutes followed by a second treatment with fresh solutions at two different contact times.

| Batch $ClO_2$ Concentration (ppm) | Contact time (min) | CFU/g after treatment | R (log batch control − log batch $ClO_2$) |
|---|---|---|---|
| Control (0 ppm) | 60 min | $3.8 \times 10^7$ | — |
| 10 ppm + 10 ppm (2nd steep) | 60 min + 60 min | $1.1 \times 10^4$ | 3.58 |
| 10 ppm + 10 ppm (2nd steep) | 60 min + 300 min | $5 \times 10^3$ | 3.88 |

R = reduction in viability

Example 2

Treatment of Barley with Chlorine Dioxide Added in the Second Steeping Step in a Pilot Steeping Chamber Further investigations were carried out in two trials involving a small pilot steeping chamber where harvested barley was treated with a chlorine dioxide solution in the second steeping. Again, a significant reduction in *Fusarium* counts were observed with the use of chlorine dioxide for steeping.

Test protocol. Harvested barley from a high load *Fusarium* batch was provided by Czech Malt and Brew Institute. A starting probe (parallel) was taken to determine initial cell load on barley with *Fusarium*. Barley (1 g) was whirled in Ringer-solution (10 ml) to detach cells. After thorough whirling ten-fold dilutions steps in sterile Ringer-solution were prepared. 1 ml sample in parallel from dilution steps $10^{-4}$, $10^{-5}$ and $10^{-6}$ were poured with sterile potato agar medium. Chlorine dioxide treated barley was prior to dilution series once washed with Ringer-solution to remove residual Chlorine dioxide. Plates were transferred into a temperature-controlled (30° C.) incubation box and grown for 3-5 days until colony formation was observed. Colonies were counted and calculated to CFU/g. Boxes with barley were placed into a steeping/germination box. The chamber was filled with town tap water for the first steeping and to remove dust and dirt. With help of Dulcotest DT1 photometer (Prominent), the free chlorine in tap water was determined to be 0.17 ppm. The first steeping was performed for 5 hours at about 14.5° C. During this time the water content in exposed barley increased up to 31.8%. After the first steeping residual water was drained. A second (parallel) barley sample was taken to determine the *Fusarium* load. The steeped barley was then exposed to air until next morning (approximately 16 hours), and a third (parallel) barley sample was taken to determine *Fusarium* load.

The second steeping was performed using an aqueous solution of chlorine dioxide. The aqueous solution was made of Diversey Bi-Spore as described in Example 1. The chlorine dioxide steeping solution was prepared from stock by diluting with town tap water. The chlorine dioxide concentration of the steeping solution was determined to be 12 ppm.

Four boxes with 0.5 kg barley each were placed into a plastic container, which then was filled with 11 L of above mentioned chlorine dioxide steeping solution. The plastic container was transferred into the steeping/germination chamber and left for another 4 hour steeping period. The chlorine dioxide concentration was periodically monitored using Dr. Lange test-kits (LCK 310/343) and DR 2800 device. (Parallel) Barley samples were taken to determine residual cell load of *Fusarium* after the chlorine dioxide steeping. Results are shown in Table 3 below.

TABLE 3

Change of chlorine dioxide concentration in the steeping solution as a function of time during steeping.

| time [min] | $ClO_2$ [mg/L] |
|---|---|
| 0 | 12.2 |
| 80 | 11.8 |
| 140 | 7.4 |
| 190 | 9.5 |
| 240 | 6.4 |

After second steeping with chlorine dioxide, the boxes were exposed to air in the closed chamber for another 20 hour period. The water level was determined to 38.1% and then adjusted to final 45.5% after a third steeping with tap water for a period of 2.5 hours. A final parallel barley sample was taken to determine residual cell load with *Fusarium* prior to germination. Treated barley then was further processed according to a quality parameter protocol of the Malting Institute. Results on cell counts of *Fusarium* are shown in Table 4.

TABLE 4

*Fusarium* counts on barley (average from parallels) during steeping treatment

| Step | Sample 1 (CFU/g) | Sample 1 (CFU/g) | Mean value (CFU/g) | Sample 1 (CFU/grain) | Sample 1 (CFU/grain) | Mean value (CFU/grain) |
|---|---|---|---|---|---|---|
| Start (prior to first steeping with tap water) | $4.82 \times 10^4$ (21 grains) | $5.00 \times 10^4$ (21 grains) | $4.91 \times 10^4$ | $2.30 \times 10^3$ | $2.38 \times 10^3$ | $2.34 \times 10^3$ |
| After first steeping (5 hours) | $6.64 \times 10^5$ (17 grains) | $5.00 \times 10^5$ (16 grains) | $5.82 \times 10^5$ | $3.91 \times 10^4$ | $3.13 \times 10^4$ | $3.52 \times 10^4$ |
| After first aeration (16 hours) | $8.64 \times 10^5$ (13 grains) | $9.00 \times 10^5$ (14 grains) | $8.82 \times 10^5$ | $6.65 \times 10^4$ | $6.43 \times 10^4$ | $6.54 \times 10^4$ |
| After second steeping with $ClO_2$ (4 hours) | $5.23 \times 10^4$ (14 grains) | $5.09 \times 10^4$ (14 grains) | $5.16 \times 10^4$ | $3.74 \times 10^3$ | $3.64 \times 10^3$ | $3.69 \times 10^3$ |
| After third steeping with tap water | $2.47 \times 10^5$ (13 grains) | $2.47 \times 10^5$ (12 grains) | $2.47 \times 10^5$ | $1.90 \times 10^4$ | $2.06 \times 10^4$ | $1.98 \times 10^4$ |

Conclusions. As shown in Table 4, initial cell counts on dry barley increased during first steeping and subsequent aeration. Fungal spores were activated by the water to start germination and growing. Due to the presence of chlorine dioxide within the second steeping step *Fusarium* numbers on barley were reduced by log 1.24 (94.15%). A recovery during the second aeration and third steeping with tap water only was observed, but counts did not reach the level of the phase after first aeration. Samples of malted barley produced from this batch were free from *Fusarium* (not shown).

Chlorine dioxide residue measurement. After draining the chlorine dioxide steeping solution from treated barley 10 ml of deionised water was added to 1 g of barley (approx. 12-13 grains) and rigorous whirled followed by decanting the supernatant and filtering the liquid through 0.45 μm filter. The presence of chlorine dioxide was tested using Dr. Lange test-kits (LCK 310/343) and the DR 2800 device. All samples tested demonstrated less than 0.2 ppm of chlorine dioxide in the wash solution, samples of malted barley from the batch treated with chlorine dioxide were free of chlorine dioxide (data not shown). Based on this data it can be concluded that by just draining the chlorine dioxide steeping solution only a very low amount of residual chlorine dioxide is left with the barley, which then can easily removed by a subsequent wash step done with water only.

Example 3

Treatment of Barley with Chlorine Dioxide Added in the Second Steeping Step in a Pilot Steeping Chamber. Comparison to a Blank Control A comparison test with a batch of barley treated with chlorine dioxide in second steeping versus a control using tap water only was carried out following the procedure described in Example 2. The chlorine dioxide in the second steeping solution was determined as initial 11 ppm and dropped to 8 ppm at the end of steeping (4 hour in total, data not shown). The effect on reduction of *Fusarium* counts were determined. Results are presented in Table 5.

The barley was also analyzed for representative mycotoxin content as follows. The high-performance liquid chromatography with mass detection (LC-MS/MS) was used for the determination of the selected *Fusarium* mycotoxins (deoxynivalenol, zearalenon) and deoxynivalenol-3-glucoside in brewing raw materials. After extraction, the homogenized samples were filtered and purified on the SPE column or immunoaffinity column. Subsequently, they were concentrated using a vacuum evaporator, transferred to aqueous methanol and analyzed with the LC-MS/MS. Results are presented in Table 6.

The results shown in Table 5 demonstrate that a significant reduction in *Fusarium* counts as well as in mycotoxins is achieved when treating the barley with chlorine dioxide compared to water as blank control or untreated (not steeped) barley.

The results shown in Table 6 demonstrate that the mycotoxin concentration of DON and DON_3_Glc on barley was significantly lower when treated with chlorine dioxide compared to the initial load of untreated barley or barley steeped with water only. The level of ZON was increased after steeping independently of whether water or chlorine dioxide was used. However the ZON level was significantly less when treated with chlorine dioxide compared to tap water only.

Conclusions. *Fusarium* counts of the batch treated with chlorine dioxide in second steeping were significantly lower than those of the control steeped with tap water only and remained constantly lower during second aeration and after third steeping.

TABLE 5

*Fusarium* counts on barley (average from duplicates) during steeping treatment with tap water (blank) or chlorine dioxide

| | Blank | | | Treated with $ClO_2$ | | | Reduction Performance | |
|---|---|---|---|---|---|---|---|---|
| Step | sample 1 (CFU/g) | sample 2 (CFU/g) | Mean value (CFU/g) | sample 1 (CFU/g) | sample 2 (CFU/g) | mean value (CFU/g) | log reduction vs. untreated control | % reduction vs. untreated control |
| start (prior to 1. steeping) | $7.12 \times 10^4$ (21 grains) | $7.89 \times 10^4$ (21 grains) | $7.51 \times 10^4$ | | | | | |
| after 1st steeping (16 hours) | $9.56 \times 10^5$ (21 grains) | $9.87 \times 10^5$ (21 grains) | $9.72 \times 10^5$ | | | | | |
| after 2nd steeping with $ClO_2$ (4 hours) | $6.75 \times 10^4$ (15 grains) | $7.12 \times 10^4$ (15 grains) | $6.94 \times 10^4$ | $4.37 \times 10^3$ (14 grains) | $4.75 \times 10^3$ (14 grains) | $4.56 \times 10^3$ | 1.18 | 93.44 |
| After 2nd aeration (20 hours) | $6.57 \times 10^4$ (14 grains) | $6.19 \times 10^4$ (15 grains) | $6.38 \times 10^4$ | $4.69 \times 10^3$ (15 grains) | $4.13 \times 10^3$ (14 grains) | $4.41 \times 10^3$ | 1.17 | 93.09 |
| after $3^{rd}$ steeping | $4.06 \times 10^4$ (13 grains) | $4.41 \times 10^4$ (14 grains) | $4.24 \times 10^4$ | $3.12 \times 10^3$ (14 grains) | $3.15 \times 10^3$ (13 grains) | $3.14 \times 10^3$ | 1.13 | 92.59 |

TABLE 6

Concentration of *Fusarium* mycotoxins (DON and ZON) on barley. Comparison of initial mycotoxin concentration (Bojos barley - 3) and mycotoxin concentration after steeping with either tap water (Bojos blank - 2) or chlorine dioxide (Bojos $ClO_2$ - 1)

| | Sample | DON µg/kg | DON_3_Glc µg/kg | ZON µg/kg |
|---|---|---|---|---|
| 1 | Bojos - $ClO_2$ | 450.4 | 751 | 12.1 |
| 2 | Bojos - blank | 505.6 | 853.4 | 19.1 |
| 3 | Bojos - barley | 1438.3 | 505.3 | 6.0 |

Example 4

Chlorine Dioxide Treatment does not Affect Subsequent Barley Malting

Chlorine dioxide-treated barley from Example 3 was further processed according to a quality parameter protocol of the Malting Institute. Germination was carried out for 3 days at 14.5° C., and kilning was carried out for 22 hours, four hours of which were at a kilning temperature of 80° C. For micromalting trial grading>2.5 mm was used. The malt was further processed to produce wort. This was analyzed using EBC (European Brewery Convention) standard methods to prove that $ClO_2$ treatment does not cause any deviation from standard parameters (see Table 7).

The wort analysis of a batch treated with chlorine dioxide compared to a batch treated with water only shows only minor differences in typical quality parameter as specified by EBC. Both batches would meet the quality standard of wort for the brewing industry. Thus, the steeping of barley with a chlorine dioxide solution does not impact the quality of processed malt and wort compared to barley steeped with water only in the usual way.

TABLE 7

Wort analysis of barely batches of Example 3 according to ECB protocol. Comparison of initial concentration (Bojos barley- 3) and after steeping with either tap water (Bojos blank - 2) or chlorine dioxide (Bojos $ClO_2$ - 1)

| Sample No. | Sample description | Water content in the barley (%) | Nitrogen substances in the barley (%) | Water content in the malt (%) | Malt extract (%) | Relative extract 45° C. (%) | Kolbach No (%) | Diastatic activity (jWK) |
|---|---|---|---|---|---|---|---|---|
| 1 | Bojos-$ClO_2$ | x | x | 4.6 | 82.0 | 39.9 | 47.1 | 350 |
| 2 | Bojos-check | x | x | 4.6 | 81.6 | 39.9 | 48.2 | 341 |
| 3 | Bojos-barley | 12.6 | 12.2 | x | x | x | x | x |

| Sample No. | Attainable degree of attenuation (%) | Friability (%) | b-glucans in wort (mg/l) | Nitrogenous compounds in malt (%) | Total nitrogen in malt (%) | Soluable nitrogen in malt (mg/l) | Soluble nitrogen in malt (%) | Glycide extract in malt (%) | DON (μg/kg) |
|---|---|---|---|---|---|---|---|---|---|
| 1 | 78.6 | 84 | 103 | 11.7 | 1.865 | 878 | 0.878 | 76.5 | 450.4 |
| 2 | 78.7 | 86 | 99 | 11.6 | 1.853 | 894 | 0.894 | 76.0 | 505.6 |
| 3 | x | x | x | x | x | x | x | x | 1438.3 |

Example 5

Industrial-Scale Treatment of Barley with Chlorine Dioxide (at about 10 Ppm) Added in the Second Steeping Step Having a Ratio of Aqueous Chlorine Dioxide to Barley of about 1:1. Comparison to a Blank Control Two independent comparison tests with batches of barley treated with chlorine dioxide in a second steeping, versus control steepings using tap water only, were carried out at industrial scale at an industrial malting site following the procedure described in Example 2. Each batch included about 56 m³ of barley, the ratio of aqueous chlorine dioxide to barley was about 1:1, and chlorine dioxide (about 10 ppm) was added during second steeping. There was no further dosage of $ClO_2$ during the subsequent germination phase. The effect on reduction of *Fusarium* counts at industrial-scale were determined at distinct phases: after a first air break, after the second steeping, and during the green malt stage (after barley germination). The results of the first comparison test, regarding Samples 1A-5A and 1B-5B, are shown in Tables 8 and 9. The results of the second comparison test, regarding Samples 6A-10A and 6B-10B, are shown in Tables 10 and 11.

The results shown in Tables 8-11 demonstrate that a significant reduction in *Fusarium* counts is achieved during industrial-scale treatment of barley when treating the barley with about 10 ppm chlorine dioxide, and where the ratio of aqueous chlorine dioxide to barley is about 1:1, compared to treatment with water as a blank control.

Conclusions. *Fusarium* counts of the industrial-scale batch of barley treated with chlorine dioxide in second steeping were significantly lower than those of the control batches steeped with tap water.

TABLE 8

Batch 1: Control vessel (no $ClO_2$ treatment)

| Sample | CFU/g after first air break | CFU/g after second steeping | CFU/g of green malt |
|---|---|---|---|
| 1A | 3.0 | 30.0 | 7.0 |
| 2A | 6.0 | 300.0 | 14.0 |
| 3A | 3.0 | 2.000.0 | 23.0 |

TABLE 8-continued

Batch 1: Control vessel (no $ClO_2$ treatment)

| Sample | CFU/g after first air break | CFU/g after second steeping | CFU/g of green malt |
|---|---|---|---|
| 4A | 5.0 | 150.0 | 13.0 |
| 5A | 8.0 | 100.0 | 30.0 |

CFU/g refers to colonyforming units of *Fusarium* per gram of barley. Chlorine dioxide was added only during second steeping.

TABLE 9

Batch 1: $ClO_2$ treatment vessel

| Sample | CFU/g after first air break | CFU/g after second steeping | CFU/g of green malt |
|---|---|---|---|
| 1B | 3.0 | 3.0 | 24.0 |
| 2B | 2.0 | 3.0 | 6.0 |
| 3B | 1.0 | 25.0 | 8.0 |
| 4B | 10.0 | 3.0 | 2.0 |
| 5B | 2.0 | 0 | 2.0 |

CFU/g refers to colonyforming units of *Fusarium* per gram of barley. Chlorine dioxide was added only during second steeping.

TABLE 10

Batch 2: Control vessel (no ClO₂ treatment)

| Sample | CFU/g after first air break | CFU/g after second steeping | CFU/g of green malt |
|---|---|---|---|
| 6A | 0 | 10.0 | 90.0 |
| 7A | 2.0 | 0 | 80.0 |
| 8A | 0 | 2.0 | 90.0 |
| 9A | 1.0 | 2.0 | 200.0 |
| 10A | 0 | 0 | 80.0 |

CFU/g refers to colonyforming units of *Fusarium* per gram of barley. Chlorine dioxide was added only during second steeping.

TABLE 11

Batch 2: ClO₂ treatment vessel

| Sample | CFU/g after first air break | CFU/g after second steeping | CFU/g of green malt |
|---|---|---|---|
| 6B | 0 | 0 | 8.0 |
| 7B | 0 | 0 | 2.0 |
| 8B | 0 | 1.0 | 5.0 |
| 9B | 1.0 | 1.0 | 16.0 |
| 10B | 2.0 | 1.0 | 6.0 |

CFU/g refers to colonyforming units of *Fusarium* per gram of barley. Chlorine dioxide was added only during second steeping.

Example 6

Industrial-Scale Treatment of Barley with Aqueous Chlorine Dioxide (20 ppm) Sprayed During Germination. Comparison to a Blank Control Comparison tests were conducted with two batches of barley at the same industrial malting site of Example 5, to determine the effect of $ClO_2$ upon *Fusarium* counts where the barley is sprayed with aqueous $ClO_2$ (20 ppm) during germination. Both batches were treated with tap water during the steeping stage. Batches 11A and 12A were also sprayed with tap water during germination, whereas batches 11B and 12B were sprayed with aqueous $ClO_2$ (20 ppm) during germination. Each batch of barley weighed approximately 56 metric tons when dry and absorbed approximately 40-50% water by weight during the steeping and germination steps. For example, the barley typically absorbed about 41-42% water during steeping. During germination water content in the barley further increased to about 45-46%. During germination, the steeped batch of barley was sprayed with about 8.8 m³ aqueous chlorine dioxide (20 ppm) solution (i.e., about 0.15 m³ aqueous chlorine dioxide solution per metric ton of dry grain). The effect of $ClO_2$ upon *Fusarium* counts, where the barley is sprayed with aqueous $ClO_2$ during germination, is shown in Table 12.

Conclusions. *Fusarium* counts on Barley of the industrial-scale batch sprayed with aqueous chlorine dioxide during germination were significantly lower than those of the control batch sprayed with tap water.

TABLE 12

Log N *Fusarium* counts upon spray treatment with tap water or aqueous ClO₂ (20 ppm) during germination.

| Sample | Day 1 | Day 2 | Day 3 | Day 4 | Day 5 |
|---|---|---|---|---|---|
| 11A* | 6.4 | 6.2 | 6.2 | 5.8 | 5.5 |
| 12A* | 6.4 | 6.2 | 6.2 | 5.8 | 5.5 |
| 11B** | 5.9 | 5.2 | 5.2 | 4.3 | 4.1 |
| 12B** | 5.8 | 5.2 | 5.2 | 4.3 | 4.0 |

*Samples 11A and 12A were treated with tap water. The samples were neither treated with ClO₂ during steeping nor sprayed with ClO₂ during germination.
**Samples 11B and 12B were not treated with ClO₂ during steeping, but were sprayed with aqueous ClO₂ (20 ppm) during germination.

EQUIVALENTS

The embodiments, illustratively described herein may suitably be practiced in the absence of any element or elements, limitation or limitations, not specifically disclosed herein. Thus, for example, the terms 'comprising,' 'including,' 'containing,' etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase 'consisting essentially of' will be understood to include those elements specifically recited and those additional elements that do not materially affect the basic and novel characteristics of the claimed technology. The phrase 'consisting of' excludes any element not specified.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent compositions, apparatuses, and methods within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as 'up to,' 'at least,' 'greater than,' 'less than,' and the like, include the number recited and refer to ranges which can be subsequently broken down into subranges as discussed above. Finally, as will be understood by one skilled in the art, a range includes each individual member.

While certain embodiments have been illustrated and described, it should be understood that changes and modifications can be made therein in accordance with ordinary skill in the art without departing from the technology in its broader aspects as defined in the following claims.

What is claimed is:

1. A method comprising steeping a harvested cereal grain in an aqueous solution comprising an effective amount of chlorine dioxide, spraying the harvested cereal grain with water comprising an effective amount of chlorine dioxide during germination, or a combination thereof, to provide a treated cereal grain;
wherein:
the harvested cereal grain has a first microorganism concentration, the treated cereal grain has a second microorganism concentration, the second microorganism concentration is reduced by at least about 50% to 99.999% compared to a third microorganism concentration of an untreated cereal grain, where the untreated cereal grain is harvested cereal grain steeped and germinated in water without chlorine dioxide under substantially similar conditions to the chlorine dioxide steeping and/or germination step;
the treated cereal grain is germinated after the steeping step; and
the effective amount of chlorine dioxide is about 1 ppm to about 50 ppm chlorine dioxide.

2. The method of claim 1, wherein the harvested cereal grain is selected from the group consisting of barley, wheat, rye, millet, corn (maize), rice, and oats.

3. The method of claim 1, further comprising repeating the chlorine dioxide steeping step.

4. The method of claim 1, wherein the aqueous solution consists essentially of chlorine dioxide and water.

5. The method of claim 1, wherein the treated cereal grain has a chlorine dioxide concentration of less than about 1 part chlorine dioxide per 200 parts treated cereal grain.

6. The method of claim 1, wherein during germination the treated cereal grain is sprayed one or more times with water comprising an effective amount of chlorine dioxide.

7. The method of claim 1, further comprising malting the treated cereal grain.

8. The method of claim 1, wherein at least one microorganism is *Fusarium*, *Alternarium*, *Muccor*, *Pendllium*, or *Aspergillus*.

9. The method of claim 1, wherein
the harvested cereal grain has a first toxin concentration;
the treated cereal grain has a second toxin concentration; and
the second toxin concentration is reduced in comparison to a third toxin concentration of the untreated cereal grain.

10. The method of claim 9, wherein the second toxin concentration is reduced from the first toxin concentration.

11. The method of claim 9, wherein the toxin is a mycotoxin.

12. The method of claim 1, wherein the effective amount of chlorine dioxide is about 1 ppm to about 20 ppm chlorine dioxide.

13. The method of claim 1, wherein the effective amount of chlorine dioxide is about 1 ppm to about 12 ppm chlorine dioxide.

14. The method of claim 1, wherein the effective amount of chlorine dioxide is about 10 ppm to about 25 ppm chlorine dioxide.

15. A method comprising steeping harvested barley grain in an aqueous solution comprising an effective amount of chlorine dioxide, spraying the harvested barley grain with water comprising an effective amount of chlorine dioxide during germination, or a combination thereof, to provide a treated barley grain;
wherein:
the harvested barley grain has a first microorganism concentration, the treated barley grain has a second microorganism concentration, the second microorganism concentration is reduced by at least about 50% to 99.999% compared to a third microorganism concentration of an untreated barley grain, where the untreated barley grain is barley grain steeped and germinated in water without chlorine dioxide under substantially similar conditions to the chlorine dioxide steeping and/or germination step; and
the effective amount of chlorine dioxide is about 1 ppm to about 50 ppm chlorine dioxide.

16. The method of claim 15, wherein the aqueous solution consists essentially of chlorine dioxide and water.

17. The method of claim 15, further comprising malting the treated barley.

18. The method of claim 15, wherein the effective amount of chlorine dioxide is about 1 ppm to about 20 ppm chlorine dioxide.

19. The method of claim 15, wherein the effective amount of chlorine dioxide is about 1 ppm to about 12 ppm chlorine dioxide.

20. The method of claim 15, wherein the effective amount of chlorine dioxide is about 10 ppm to about 25 ppm chlorine dioxide.

* * * * *

UNITED STATES PATENT AND TRADEMARK OFFICE
CERTIFICATE OF CORRECTION

PATENT NO. : 9,622,495 B2
APPLICATION NO. : 14/346516
DATED : April 18, 2017
INVENTOR(S) : Henry von Rege, Petr Basar and Karel Kosar Page 1 of 1

It is certified that error appears in the above-identified patent and that said Letters Patent is hereby corrected as shown below:

In the Claims

Claim 8, Column 25, Line 50:
Delete "*Pendllium*" and insert --*Penicillium*--.

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*